United States Patent [19]

Hamilton

[11] Patent Number: 5,393,115
[45] Date of Patent: Feb. 28, 1995

[54] ALTERNATIVE PICKUP TRUCK TAILGATE

[76] Inventor: Kenneth B. Hamilton, 1408 Granville Rd., Westfield, Mass. 01085

[21] Appl. No.: 51,752

[22] Filed: Apr. 26, 1993

[51] Int. Cl.⁶ .......................................... B62D 33/033
[52] U.S. Cl. ...................................... 296/52; 296/50; 16/263; 16/386; 410/143
[58] Field of Search ...................... 296/50, 52; 16/223, 16/263, 381, 386; 410/129, 131, 135, 143

[56] References Cited

U.S. PATENT DOCUMENTS

| | | | |
|---|---|---|---|
| 126,943 | 5/1872 | Fallick | 296/50 |
| 1,742,699 | 1/1930 | Fellows | 16/386 X |
| 2,429,805 | 10/1947 | Conner | 296/50 |
| 4,412,711 | 11/1983 | Suska | 16/223 X |
| 4,839,629 | 6/1989 | Brown | 362/80 X |
| 4,951,350 | 8/1990 | Nunes | 16/386 X |
| 5,205,667 | 4/1993 | Montgomery, Sr. | 16/263 X |

FOREIGN PATENT DOCUMENTS

| | | | |
|---|---|---|---|
| 165899 | 12/1884 | France | 16/263 |
| 2401545 | 7/1975 | Germany | 16/223 |
| 25690 | 8/1932 | Netherlands | 16/386 |
| 0330857 | 6/1930 | United Kingdom | 16/386 |

*Primary Examiner*—Dennis H. Pedder

[57] ABSTRACT

This invention relates to an alternative device for a tailgate to a pickup truck. The device includes a horizontal beam assembly to be installed across the open back of a pickup truckbed having a cylindrical pivot hinge on one end and a handle-latch at the other end. The pivot hinge can be installed at any height along the open truckbed so as to provide a functional impediment to loss of cargo depending on the size of cargo carried by the operator of the vehicle. The beam assembly can be raised or lowered to accommodate the size of cargo carried in the truckbed.

The beam assembly is wired electrically for a rear brake lamp which would be connected to the wiring for the truck tail lights. The beam feature is an improvement over a full tailgate as it allows for the flow of air out of the truckbed to reduce drag and increase gas mileage. The secure nature of the beam is an improvement over alternative tailgates such as "netting" which allows for the flow of air out of the truckbed but does not constitute a secure impediment to the loss of cargo out of the truckbed. The beam feature is an improvement over the full tailgate for the additional reason that it allows the driver a clear view through the open truckbed to aid in parking and maneuvering the truck.

1 Claim, 2 Drawing Sheets

ALTERNATIVE PICKUP TRUCK TAILGATE

BACKGROUND OF THE INVENTION (1) Field of the Invention

This invention relates to automobile parts and accessories for pick-up trucks, specifically in the area of tailgate construction.

(2) Description of the Prior Art

The prior art known to the Applicant reveals the standard tailgate construction which limits the usability of the truck bed.

The claimed invention is, therefore, a unique and novel device over the prior art in the area of tailgate construction. The invention provides all of the features which the prior art attempts to address. No other device provides (1) an impediment to cargo; (2) increased rear visibility; (3) provides for the flow of air out of the truckbed; and (4) and has the same hinge structure as the claimed invention. The claimed invention provides each of these features in addition to being simple to construct, install and use.

SUMMARY OF INVENTION AND DESCRIPTION OF THE PREFERRED EMBODIMENT

Figure 1:
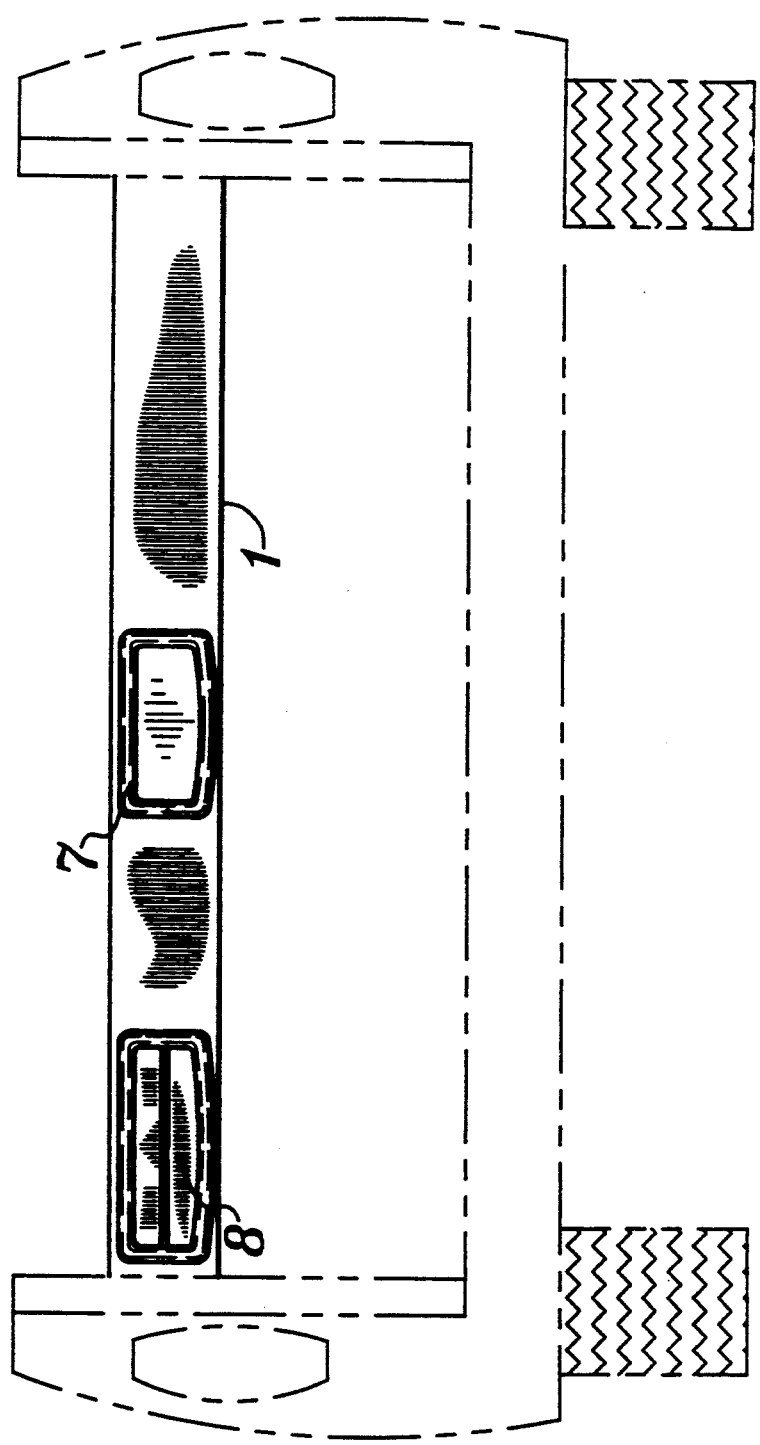
FIG. 1: A view of the rear of the pickup truck showing placement of the invention on the truck.
Figure 2:
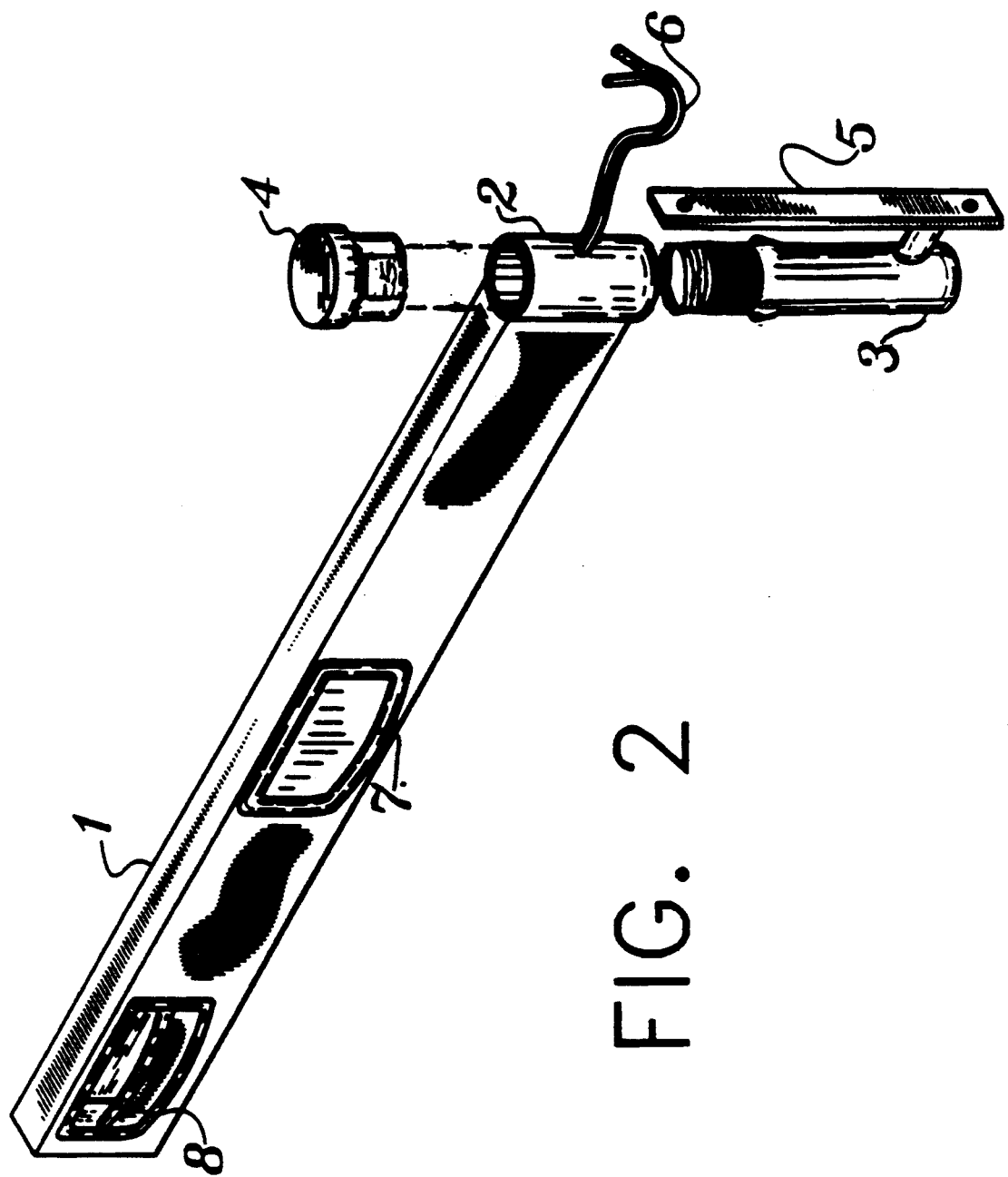
FIG. 2: A detailed view of the components of the invention.

As shown on the drawings, the invention is a horizontal bar (1) constructed out of a material such as steel, wood, polyvinylchloride or any similar material. The preferred embodiment of the invention is three dimensional, approximately two inches thick and five inches wide. It is as long as necessary to meet the expanse of the open truckbed. One end of the invention has a pivot hinge consisting of a cylindrical tube (2) which is coextensive with the top and bottom end of the horizontal bar and which fits over another cylindrical tube (3) which is threaded to interlock with a cap (4) which receives the top of the cylindrical tube (3) and which is threaded to interlock with cylindrical tube (3). Cylindrical tube (3) is connected to a bracket (5) which connects to the truck body via bolts. The bracket can be placed at any height along the opening of the truckbed so as to impede the cargo carried. The invention is wired for electricity (6) to power the brake lamp (7) at a central location of the bar. The other end of the bar has a handle/latch (8) for opening the tailgate.

What is claimed is:

1. What is claimed is an alternative pickup truck tailgate consisting of a horizontal bar having two ends and a center point, one of said ends having a first cylindrical tube, said first cylindrical tube having a top end a bottom end coextensive with a top and bottom end of the bar, respectively, said top end receiving a cap and said bottom end receiving a pivot hinge consisting of a second cylindrical tube being smaller in diameter than said first cylindrical tube and having a top end of said second cylindrical tube and a bottom end, said top end of said second cylindrical tube being threaded so as to receive said cap and said bottom end being closed and having adjacent thereto a horizontal connection to a bracket consisting of a plate with openings for bolts to be secured to the truckbed, said first cylindrical tube receiving electrical wiring, which electrical wiring passes through said horizontal bar to a central location having a lamp and brake light, said other end of said horizontal bar having a handle and latch which interfaces with hardware connected to said truckbed so as to open and close said horizontal bar.

* * * * *